No. 881,929.
PATENTED MAR. 17, 1908.
W. F. JENSEN.
RENOVATING BUTTER, OILS, &c.
APPLICATION FILED JULY 31, 1905.
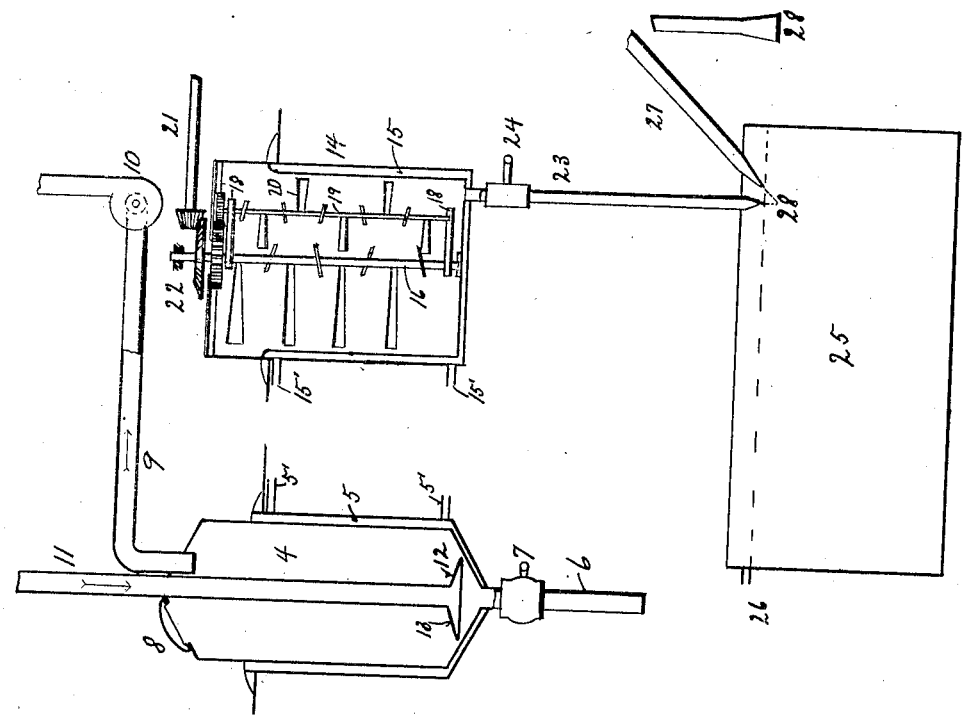
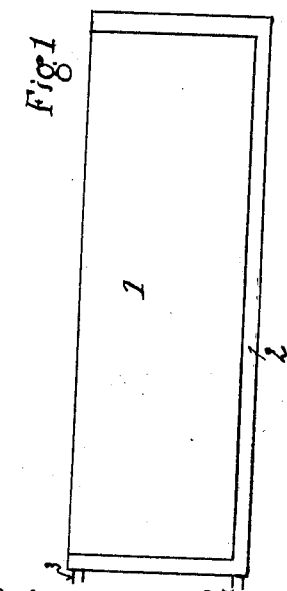
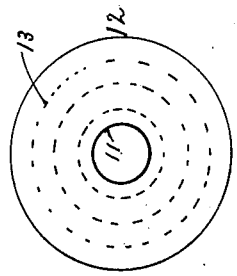
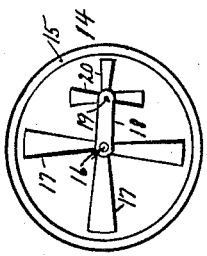
Witnesses
John A Hulit
Inventor
Niggo F. Jensen
By J. A. Rosen atty

UNITED STATES PATENT OFFICE.

WIGGO F. JENSEN, OF LINCOLN, NEBRASKA.

RENOVATING BUTTER, OILS, &c.

No. 881,929.   Specification of Letters Patent.   Patented March 17, 1908.

Application filed July 31, 1905. Serial No. 271,912.

*To all whom it may concern:*

Be it known that I, WIGGO F. JENSEN, a citizen of the United States, and resident of the city of Lincoln, in the county of Lancaster and State of Nebraska, have invented a new and useful Improvement in the Art of Renovating Butter, Oils, Fats, Lard, Liquids, and the Like, of which the following is a specification.

The invention relates to processes which include treatment by aeration, and wherein, preferably, the use of chemicals is dispensed with and wherein preferably the cleansing proper is accomplished chiefly by precipitation, skimming, washing or showering, and aeration.

Objects are: to improve the process so that the renovation may be accomplished in less time than has been possible with present methods of the general nature described; to provide for the purifying by aeration in less time than has heretofore been required; to provide a method whereby the pure air may be brought immediately from the source of supply without passing through a blower or filter; to accelerate the separation of the objectionable gases from the substance under treatment; to provide for a vacuum treatment of the substance whereby the tendency of the volatile impurities to volatize will be greatly increased over the present method of aeration by compressed air; and to simplify the process by eliminating certain steps heretofore considered necessary in processes of this kind, and to alter other steps so as to improve the product.

Other objects will appear hereinafter.

In the drawings accompanying and forming part of this specification, and in the description thereof, I have shown, partly in diagram, the preferred form of apparatus used in working my invention, and the best mode of applying the principles thereof; but it is to be understood that I do not limit myself to the drawings or to the description of the drawings, that the steps or parts herein separately claimed may be used in connection with other processes of like general nature, and that I contemplate changes in form, proportions, materials, transposition of parts, and the substitution of equivalent steps or parts, without departing from the spirit of the invention.

To clearly illustrate the principles of my invention, I have shown an apparatus for renovating impure butter. I have not shown all the steps, because some, such as placing the crystals on the ripening trays, and the churning, are too well known to require description here.

Figure 1 represents, partly in diagram, the apparatus from the melting tank into which the impure butter is first placed, to and including the crystallizing tank into which the emulsified product is plunged. Fig. 2 is an enlarged top view of the air inlet pipe of the aerating tank, showing the perforated diaphragm at the bottom. Fig. 3 is a plan view of the emulsifier showing the arrangement of the paddles.

Like reference numerals indicate like or corresponding parts throughout the several views.

1 is the melting tank into which the butter to be treated is first placed, raised to a temperature of about 120 to 125 degrees Fahrenheit, and allowed to stand for four or five hours at that temperature. This allows the impurities such as the salt and other solid and semi-solid matters to settle to the bottom, and others, as the casein, the lighter substances, to rise to the surface where they may be skimmed off. The tank may be maintained at a proper temperature by the circulation of hot water through the water jacket 2, provided with inlet and outlet 3, 3. The butter oil is then drawn or pumped into the aerating tank 4, through the port 8 of which the cover is removed, and is there maintained at a temperature of about 110 degrees during the process of washing and aeration. There it is first thoroughly washed by forcing water, also at a temperature of about 110 degrees, through same from the top and preferably from a nozzle, to carry the floating impurities to the bottom. After washing, the mixture is allowed to stand about two hours, when the sediment and water in the bottom of the tank may be drawn off through the outlet and valve 6 and 7, respectively. The butter oil may then be subjected to another washing, then allowed to stand for another two hours, when the sediment and water may be again drawn off. The cover 8 is then put on; and the tank is now air-tight, except for the air inlet pipe 11 and the exhaust pipe 9. Inlet pipe 11 is connected with a suitable pure air supply, for instance it may have its opening out of doors in any suitable location where it is not apt to collect dust, smoke, or other impurities, and the inner or discharge end is provided with a diaphragm 12, which is perforated 13, to discharge the air in small streams up through the butter oil. The exhaust 9 connected with the upper, or air-chamber, portion of the tank, and is provided with an exhaust or suction fan 10, which exhausts the air from the tank and discharges it away therefrom, as out of doors where it cannot remain in contact with the products under treatment or pollute the air in the room in which the tank is installed. As the fan is operated to exhaust the air from the tank 4, pure air is forced into the inlet pipe 11, and up through the butter oil, by atmospheric pressure. It must be understood, however, that I contemplate, not the mere circulation of air through the butter oil, but to a considerable extent an actual and appreciable rarefaction of the air in the tank. To this end attention must be given to the relative capacities of the fan and the inlet perforations, in order that only a limited supply of pure air may be admitted; in other words, the air must not be admitted too freely to prevent such appreciable rarefaction.

Heretofore the aeration has been accomplished by the use of a blower to force the air under pressure through the liquid. But that method is objectionable, in view of my improved method, for several reasons: The air in passing through the blower becomes contaminated with particles of oil and accumulates objectionable odors, this requires filtering, and even the filtering does not entirely remove them; the filtering requires extra pressure on the air; the blower tanks heretofore used are open at the top, and hence the impure air which arises from the liquid is allowed to remain in the room and thus to contaminate the matter under treatment; the capacity for the air under pressure to carry off the impurities is not so great as the rarefied air; and there is no greater tendency of the volatile impurities to volatilize than when the butter is in the open air, except of course, as these substances are carried off by the passage of the air through the butter oil. Now, with my improved method of aeration, I bring the pure air directly from the pure air supply, without passing it through either a blower or a filter, although a filter might be used to further purify the air if desired; the impure air and gases arising from the liquid are immediately drawn off and out of contact with the substances under treatment and may be discharged out of doors or elsewhere; the rarefaction of the air, and the consequent reduction of pressure on the liquid itself, increases the tendency of the volatile impurities to volatilize, and also increases the capacity of the pure air which is discharged up through the butter oil and which is also to some extent expanded, to carry off impurities. I find that where with the former method about eight hours are required to remove the offensive odors from a given quantity of butter oil, I can do the same work under the same circumstances, with my improved method of aeration, in from four to six hours; and this increased efficiency I attribute largely to the principles above stated.

The desired temperature of the aerator may be maintained by the water jacket 5 having inlet and outlet 5', 5'.

After the washing and aerating just described, the temperature of the butter oil is reduced to about 98 degrees, and the oil is drawn or pumped into the emulsifier 14, consisting of a tank which is jacketed 15 (the jacket being provided with inlet and outlet 15', 15') and through the center of which extends a shaft 16 provided with vanes or paddles 17, 17, and with two arms 18, 18, between which extends another shaft 19 provided with smaller paddles 20, 20; shafts and paddles are driven by suitable gearing 22. The purpose of this arrangement of the shafts and paddles is to thoroughly mix the contents, but without at the same time aerating same. While the emulsifier is in operation, I pour into the tank a quantity of ripened skim milk of about 25 or 26 c. c. (Mann's acid test), at a temperature of about 70 degrees, and equal to about sixty per cent. of the quantity of butter oil in the can. When this skim milk or other milk is mixed with the butter oil in the presence of an air blast, as heretofore practiced to some extent, I find that the mixture will not crystallize perfectly, that it contains air globules or bubbles, and that the product in the cold bath is frequently lumpy. By thoroughly mixing, without aeration during the mixing, I find that the mixture crystallizes perfectly. The addition of the skim milk as above, is for the purpose of giving the true butter flavor to the product, and brings the temperature of the mixture to about 84 or 85 degrees.

The contents of the emulsifier are then allowed to flow into the ice-water, or crystallizing tank 25, wherein the water is maintained at a temperature of about 50 degrees, a nozzle 27 discharging water at a temperature of about 40 degrees thereinto constantly during the flow of the mixture from the emulsifier. The two nozzles 28, 28 are preferably flattened so as to discharge thin sheets of liquid, and are in close relation to each other near the water lever as shown. An outlet 26 may be provided to carry off the surplus water. The mixture from the emulsifier crystallizes immediately. The crystals are then skimmed off into the ripening trays and kept in a cooling room at a temperature of about 65 degrees for about twelve hours, and then washed and churned in the usual manner, but preferably without the further addition of milk, cream, or butter.

What I claim is:

1. An improvement in the art described consisting of first melting the butter and removing impurities by skimming and precipitation, then washing same with warm water without chemicals or salt, then drawing off the water, then aerating the melted butter in the absence of chemicals or salt and without the addition of skim milk, butter-milk, whey, or their equivalents, then adding ripened skim milk during mild agitation but without aeration, and then crystallizing, ripening, and churning the product.

2. An improvement in the art described consisting of first melting the butter and removing impurities by skimming and precipitation, then washing same with pure water, then drawing off the water, then aerating the melted butter in the absence of chemicals or salt and without forming an emulsion, then adding ripened skim milk or its equivalent during mild agitation but without aeration, and then crystallizing, ripening, and churning the product.

3. An improvement in the art described consisting of first melting the butter and removing impurities by skimming and precipitation, then washing same with pure water without salt, then drawing off the water, then aerating the melted butter without forming an emulsion, then adding ripened skim milk during mild agitation but without aeration to form an emulsion, and then crystallizing, ripening, and churning the product.

4. An improvement in the art described consisting of first melting the butter and removing impurities by skimming and precipitation, then washing same with pure water, then aerating the melted butter without forming an emulsion and without the presence or addition of any chemical or salt or skim milk or their equivalents during aeration, then adding ripened skim milk or its equivalent during mild agitation but without aeration to form an emulsion, and then crystallizing, ripening, and churning the product.

5. An improvement in the art described consisting of first melting the butter and removing impurities by skimming and precipitation, then washing same with pure water, then aerating the melted butter without forming an emulsion and without the presence or addition of any chemical or salt or skim milk or their equivalent during aeration, then adding ripened skim milk during mild agitation to mix same but without aeration to form an emulsion, and then crystallizing, ripening and churning the product.

In testimony whereof I have hereunto subscribed my name in the presence of witnesses.

WIGGO F. JENSEN.

Witnesses:
C. T. HAYS,
P. T. BOSWORTH.